United States Patent
Badiei et al.

(10) Patent No.: US 8,275,182 B2
(45) Date of Patent: Sep. 25, 2012

(54) METHOD FOR AUTOMATED DELINEATION OF CONTOURS OF TISSUE IN MEDICAL IMAGES

(75) Inventors: Sara Badiei, Vancouver (CA); Septimiu Edmund Salcudean, Vancouver (CA); Seyedeh Sara Mahdavi, Vancouver (CA)

(73) Assignee: The University of British Columbia University-Industry Liaison Office, Vancouver (CA)

( * ) Notice: Subject to any disclaimer, the term of this patent is extended or adjusted under 35 U.S.C. 154(b) by 1029 days.

(21) Appl. No.: 12/240,878

(22) Filed: Sep. 29, 2008

(65) Prior Publication Data

US 2009/0136108 A1 May 28, 2009

Related U.S. Application Data

(60) Provisional application No. 60/975,749, filed on Sep. 27, 2007.

(51) Int. Cl.
*G06T 19/20* (2011.01)
*G06T 9/20* (2006.01)
*G06K 9/48* (2006.01)

(52) U.S. Cl. ......... 382/128; 382/243; 128/916; 128/922

(58) Field of Classification Search .......... 382/128, 382/131, 132, 103, 106, 173, 175, 181, 190, 382/195, 199, 241, 243, 248, 266, 285, 286, 382/293, 299, 325; 128/922, 916
See application file for complete search history.

(56) References Cited

U.S. PATENT DOCUMENTS

| | | | |
|---|---|---|---|
| 5,810,007 A * | 9/1998 | Holupka et al. | 600/439 |
| 5,820,559 A | 10/1998 | Ng | |
| 6,561,980 B1 * | 5/2003 | Gheng et al. | 600/443 |
| 6,610,013 B1 | 8/2003 | Fenster | |
| 6,659,953 B1 | 12/2003 | Sumanaweera | |
| 6,778,690 B1 | 8/2004 | Ladak | |
| 6,842,638 B1 * | 1/2005 | Suri et al. | 600/425 |
| 7,162,065 B2 | 1/2007 | Ladak | |
| 7,856,130 B2 * | 12/2010 | Suri et al. | 382/128 |
| 2004/0013292 A1 | 1/2004 | Raunig | |
| 2004/0101184 A1 | 5/2004 | Silvaramakrishna | |

(Continued)

FOREIGN PATENT DOCUMENTS

WO WO2004093687 11/2004

(Continued)

OTHER PUBLICATIONS

Abolmaesumi, P., et al., "Image guided control of a robot for medical ultrasound", IEEE Trans. Rob. Aut., 18(1):11-23, Feb. 2002.

(Continued)

*Primary Examiner* — Anastasia Midkiff
(74) *Attorney, Agent, or Firm* — Jeffer Mangels Butler & Mitchell LLP

(57) ABSTRACT

The present invention relates to a method for delineating the contour of an object in captured medical images by first transforming the shape of the object into a simple geometric shape that is more computationally tractable than the shape of the object. After the contour of the transformed shape is detected, the inverse of the transformation is applied to the contour such that it represents the contour of the object in the captured medical image.

20 Claims, 9 Drawing Sheets

U.S. PATENT DOCUMENTS

| | | |
|---|---|---|
| 2004/0218797 A1 | 11/2004 | Ladak |
| 2005/0004465 A1 | 1/2005 | Abuhamad |
| 2007/0014462 A1 | 1/2007 | Rousson |

FOREIGN PATENT DOCUMENTS

| | | |
|---|---|---|
| WO | WO2005065028 | 7/2005 |
| WO | WO2005092197 | 10/2005 |

OTHER PUBLICATIONS

Abolmaesumi P., and M. Sirouspour, "An interacting multiple model probabilistic data association filter for cavity boundary extraction from ultrasound images", IEEE Transactions on medical Imaging, 23(6):772-784, Jun. 2004.

Badiei, Sara, Septimiu E. Salcudean, Jim Varah and James Morris. "Prostate segmentation in 2D ultrasound images using image warping and ellipse fitting", presented at 9th MICCAI Conference, Oct. 2006, Denmark.

Badiei, Sara, et al. "Semi-automatic prostate segmentation", Poster, Presented May 2007, Chicago.

Boyd, Stephen and Lieven Vandenberghe, Convex Optimization, Chapter 8, pp. 398-453, Cambridge University Press, 2004.

Fitzgibbon, A., M. Pilu and R. Fisher, "Direct least square fitting of ellipses", IEEE Trans. Pattern Anal. Mach. Intellig., 21(5):476-480, May 1999.

Levenberg, K. "A method for the solution of certain non-linear problems in least squares", Appl. Math., 2:164-168, 1944.

Li, Q., and J.G. Griffiths, "Least squares ellipsoid specific fitting", Proceedings of the Geometric Modeling and Processing/IEEE Comp Soc, 2004.

Mandavi Sara and Septimiu E. Salcudean, "3D prostate segmentation based on ellipsoid fitting, image tapering and warping", Conf. Medical Image Computing and Computer-assisted Intervention, pp. 17-24, 2006.

Marquardt, D., "An algorithm for least-squares estimation of nonlinear parameters", SIAM J. Appl. Math., 11 (2):431-441, Jun. 1963.

\* cited by examiner

METHOD FOR AUTOMATED DELINEATION OF CONTOURS OF TISSUE IN MEDICAL IMAGES

RELATED U.S. APPLICATIONS

This application claims the benefit of U.S. Patent Application No. 60/975,749, filed on Sep. 27, 2007, which is incorporated herein by reference in its entirety.

ACKNOWLEDGEMENT OF GOVERNMENT SUPPORT

This invention was made with Government support under grant R21 CA120232 awarded by the National Institutes of Health. The Government has certain rights in the invention.

FIELD OF THE INVENTION

The present invention generally relates to the automated delineation of the contours of tissue in medical images.

BACKGROUND OF THE INVENTION

Prostate cancer is the most commonly diagnosed cancer in American men. Transperineal interstitial permanent prostate brachytherapy (TIPPB) is a minimally invasive, low cost, curative treatment method used to treat prostate cancer. In this treatment, 90-150 radioactive seeds are implanted into the prostate to irradiate and kill the prostate along with the cancer. An ultrasound (US) probe is inserted into the rectum of a patient and operated to capture a series of trans-rectal ultrasound (TRUS) images of the prostate (hereinafter referred to as "captured images") spaced at predetermined distances along the length of the prostate. Each captured image comprises a cross-section of the prostate. Typically, oncologists manually identify the contour of the prostate in each image to define a segmented volume of the prostate. The process of identifying the contour of the cross-section of a prostate is commonly referred to as "segmentation". The oncologist uses the segmented volume to define a treatment plan specifying the locations in the prostate for which the radioactive seeds are to be implanted. The seeds are implanted into the prostate by a needle inserted into the prostate and guided by a needle guiding template. Manual segmentation is time consuming. Automated segmentation also is known. However, a need exists for an improved method for delineating the contours of the tissue in the images.

BRIEF SUMMARY OF THE PREFERRED EMBODIMENTS

According to one aspect of the invention there is provided a method for delineating the contour of a tissue region in a captured medical image, the captured image comprising a captured cross-section of the tissue region, the method comprising the steps of:
(a) generating a transformed image of the captured image by applying a transformation to the captured image such that the captured cross-section in the captured image is transformed into a transformed cross-section in the transformed image that resembles a pre-determined two-dimensional shape which is more computationally tractable than the captured cross-section;
(b) solving for an initial edge contour of the tissue region by fitting the pre-determined two-dimensional shape to the transformed cross-section;
(c) detecting the edge of the transformed cross-section by applying an edge-detector method within a search area of the transformed image about the initial edge contour;
(d) solving for a final edge contour by fitting the pre-determined two-dimensional shape to the detected edge of the transformed cross-section;
(e) solving for the two-dimensional contour of the tissue region in the captured image by applying the inverse of the transformation to the final edge contour; and
(f) displaying the two-dimensional contour on a display.

The transformation can comprise a warping function determined based on initialization points selected in the captured image. The warping function may translate image elements in the captured image towards the center of the ultrasound probe such that:
(a) image elements that are a closer radial distance to the center of the ultrasound probe are translated a greater radial distance towards the center than image elements that are a farther radial distance from the center; and
(b) image elements that are a closer angular distance to a selected axis originating at the center of the ultrasound probe are translated a greater radial distance towards the center than image elements that are a farther angular distance from the axis.

The step of solving for the initial edge contour can comprises the steps of:
(a) determining a number of warped points in the transformed image; and
(b) fitting the pre-determined two-dimensional shape to the warped points.

The tissue region can be a human prostate organ. The captured image can be an ultrasound image captured by an ultrasound probe. The predetermined two-dimensional shape can be an ellipse.

According to another aspect of the invention, there is provided a method for delineating the contour of a tissue region in a set of captured medical images, each captured image comprising a captured cross-section of the tissue region, the method comprising the steps of:
(a) selecting a first captured image from the set of captured images of the tissue region;
(b) for the first captured image:
(i) generating a transformed image of the first captured image by applying a transformation to the first captured image such that the captured cross-section in the first captured image is transformed into a transformed cross-section in the transformed image that resembles a pre-determined two-dimensional shape which is more computationally tractable than the captured cross-section;
(ii) solving for an initial edge contour by fitting the pre-determined two-dimensional shape to the transformed cross-section;
(iii) detecting the edge of the transformed cross-section by applying an edge-detector method within a search area of the transformed image about the initial edge contour; and
(iv) solving for a final edge contour by fitting the pre-determined two-dimensional shape to the detected edge of the transformed cross-section;
(c) for each captured image in the set of captured images, other than the first captured image:
(i) generating a transformed image by applying the transformation to the captured image such that the captured cross-section in the captured image is transformed into a transformed cross-section in the transformed image that resembles the pre-determined two-dimensional shape.
(ii) solving for an initial edge contour;
(iii) detecting the edge of the transformed cross-section by applying an edge-detector method within a search area of the transformed image about the initial edge contour; and
(iv) solving for the final edge contour by fitting the first pre-determined two-dimensional shape to the detected edge of the transformed cross-section;
(d) solving for a final surface contour of the tissue region by fitting a pre-determined three-dimensional shape to the final edge contours associated with each captured image in the set of captured images.
(e) solving a three-dimensional contour of the tissue region by applying the inverse of the transformation to the final surface contour; and
(f) displaying a cross-section of the three-dimensional contour on a display.

The step of solving an initial contour in step (c)(ii) can comprise selecting the initial contour as a final edge contour associated with a different captured image.

The step of solving the three-dimensional contour of the tissue region can comprise the steps of:
(a) segmenting the final surface contour into a set of refined edge contours, each refined edge contour comprising a cross-section of the final surface contour; and
(b) solving for the three-dimensional contour of the tissue region by applying the inverse of the transformation to each refined edge contour.

Solving for the final surface contour can comprise the steps of:
(a) solving for an initial surface contour by fitting the pre-determined three-dimensional shape to the final edge contours of the transformed images associated with the set of captured images; and
(b) solving for the final surface contour by fitting the pre-determined three-dimensional shape to the refined edge contours, an apex contour and a base contour.

The transformation can be a warping function determined based on initialization points selected in the first captured image.

The step of solving for the initial edge contour can comprise the steps of:
(a) solving for warped points in the transformed image; and
(b) fitting the pre-determined two-dimensional shape to the warped points.

The pre-determined two-dimensional shape can be an ellipse and the pre-determined three-dimensional shape can be an ellipsoid.

The transformation can comprise the application of the following functions to the captured image:
(a) a warping function determined based on initialization points selected in the first captured image; and
(b) an un-tapering function determined based on an apex plane and a base plane selected from the set of captured images, and the location of the initialization points in the captured image after application of the warping function.

The step of solving an initial contour in step (c)(ii) can comprise selecting a cross-section of a three-dimensional contour formed by:
(a) fitting a first semi-ellipsoid to the apex plane and the final edge contour associated with the first captured image; and
(b) fitting a second semi-ellipsoid to the base plane and the final edge contour associated with the first captured image.

The pre-determined two-dimensional shape can be an ellipse and the pre-determined three-dimensional shape can be a tapered ellipsoid.

The tissue region can be a human prostate organ. The set of captured images can be ultrasound images captured by an ultrasound probe. The first captured image can be a cross-section of the mid-gland of the prostate.

The warping function can translate image elements in the captured image towards the center of the ultrasound probe such that:
(a) image elements that are a closer radial distance to the center of the ultrasound probe are translated a greater radial distance towards the center than image elements that are a farther radial distance from the center, and
(b) image elements that are a closer angular distance to a selected axis originating at the center of the ultrasound probe are translated a greater radial distance towards the center than image elements that are a farther angular distance from the axis.

DETAILED DESCRIPTION OF THE PREFERRED EMBODIMENTS

The embodiments of the present invention relate to a method and apparatus for automated segmentation of a human prostate organ in ultrasound medical images.

Automated Segmentation Method

The automated segmentation method can be applied to: 1) a single two-dimensional captured image, 2) a series of two-dimensional captured images captured independently, or 3) a series of two-dimensional images derived from a captured three dimensional image containing the prostate organ to be segmented.

Two-Dimensional Method

Figure 3:
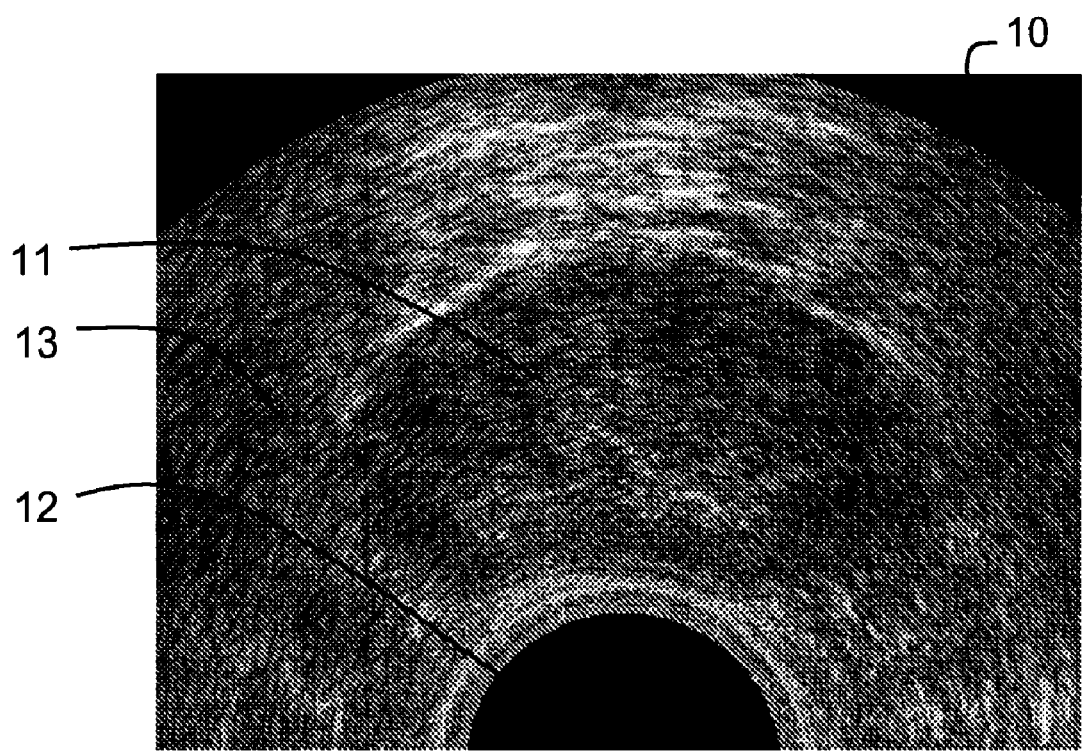
FIG. 3 is an ultrasound image of a cross-section of a prostate captured by the apparatus shown in FIG. 1.

Generally, the prostate is a walnut-shaped organ with a roughly elliptical cross-section. During the acquisition of a captured image, an ultrasound probe is pressed anteriorly against the rectum wall of a patient which causes the prostate to deform around the probe. Referring to FIG. 3, a captured image 10 captured by the ultrasound probe 12 is shown comprising the cross-section of the ultrasound probe 12, a cross-section of a prostate 11 deformed around the probe 12 (hereinafter referred to as the "captured cross-section"), and bodily tissues 13 surrounding the prostate 11. The shape of the captured cross-section 11 is relatively complex and the boundary between the captured cross-section 11 and the surrounding tissues 13 is poorly defined. As such, modeling and detecting the contour of the captured cross-section 11 can be complex and computationally expensive when using prior art techniques.

In the present embodiment, automated segmentation of the captured cross-section 11 is achieved by first transforming the complex shape of the captured cross-section 11 into a simple parametric, geometric shape that is more computationally tractable than the captured cross-section. After the contour of the transformed captured cross-section is detected, the inverse of the transformation is applied to the contour such that it represents the contour of the captured cross-section 11 in the original captured image 10.

The term "computationally tractable" means one or more of: (i) the geometric shape can be generated in a computationally inexpensive manner as a function of the parameters describing it; (ii) the parameters of the geometric shape can be adjusted in a consistent manner to obtain a best shape fit to a possibly large number of image points; and (iii) the parameter adjustment of the geometric shape can be done in a computationally inexpensive manner. An ellipse is an example of such a geometric shape. The shape is parameterized by the origin coordinates $x_0$, $y_0$, the major axis a, the minor axis b, and the angle $\Phi$, about the major axis a. Given the parameters describing the ellipse, its shape can be traced in polar or Cartesian coordinates. Given a set of points in the plane, the parameters ($x_0$, $y_0$, a, b, $\Phi$) of an ellipse that best fits these points can be found by solving a convex optimization problem. This means that there will be a single and therefore consistent solution to the ellipse parameters that globally achieve the best fit as defined by a cost function, which may be, for example, the sum of the distances from the ellipse to the points.

As discussed above, the prostate is a generally walnut shaped organ with roughly elliptical cross-sections along the longitudinal axis thereof, which is deformed about an ultrasound probe when it is inserted into a patient. It has been found that this deformation can be reversed by applying a transformation to the captured cross-section, transforming the relatively complex shape of the deformed captured cross-section into an approximately elliptical shape. The ellipse is a simple geometric shape that is used to simplify the modeling and detection of the contour of a captured cross-section, as is further described below.

Step One—Initialization

Figure 2A:
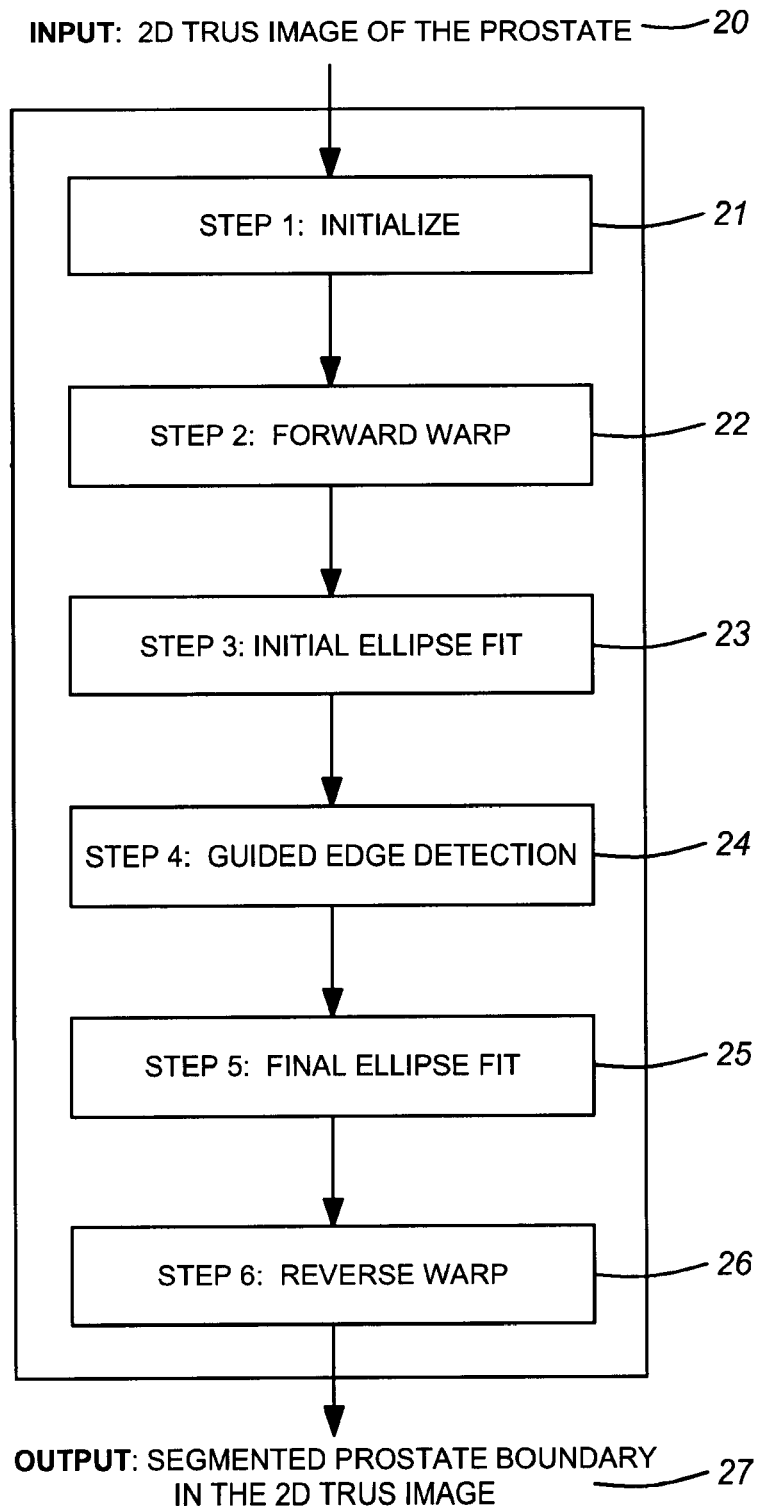
FIG. 2a is a process diagram for a two-dimensional automated segmentation method for imaging a prostate for use in the apparatus shown in FIG. 1, according to another embodiment of the invention.
Figure 2D:
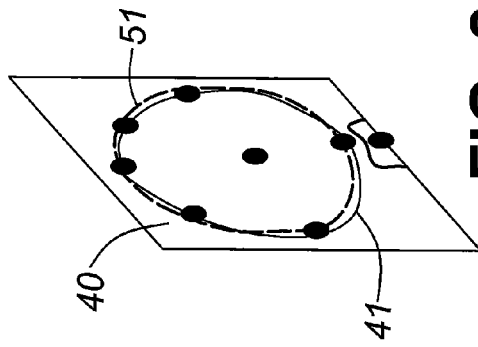
FIG. 2d is a perspective schematic view of the transformed image shown in FIG. 2c with an initial ellipse fit to the warped points shown in stippled lines.
Figure 2G:
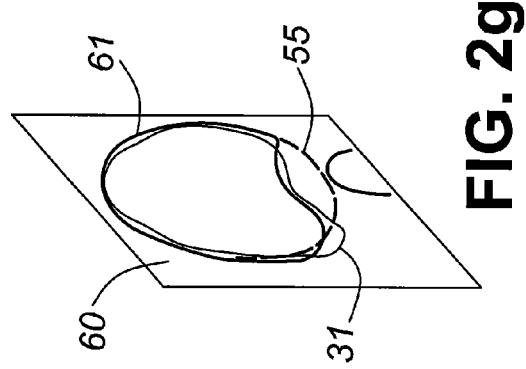
FIG. 2g is a perspective schematic view of the captured image shown in FIG. 2a with the calculated contour of the prostate shown in bold solid lines over top of the final ellipse of FIG. 2f shown in stippled lines and the actual contour of the prostate shown in thin solid lines.
Figure 2C:
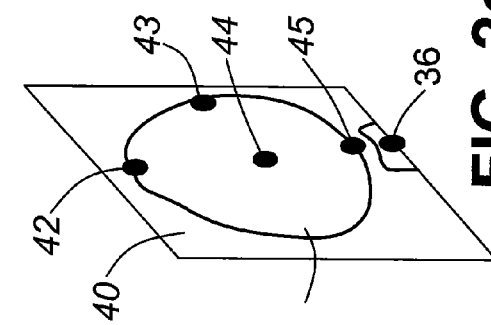
FIG. 2c is a perspective schematic view of a transformed image of the captured image shown in FIG. 2c with a series of warped points (warped according to the method shown in FIG. 2a).
Figure 2B:
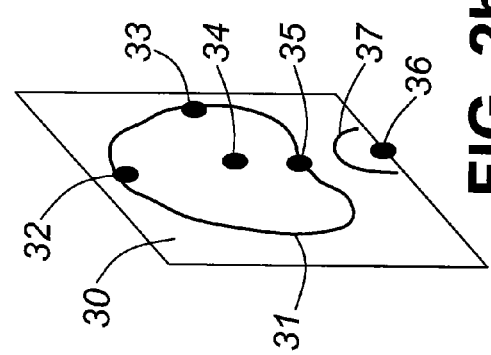
FIG. 2b is a perspective schematic view of a captured image containing the cross-section of a prostate with a series of initialization points.

In order to transform the captured cross-section in the captured image into an ellipse, first, a set of initialization points are selected in the captured image. The initialization points define i) the location of the ultrasound probe and ii) the location and boundaries of the captured cross-section. These points are used to determine the transformation to be applied to the capture cross-section and to guide an edge detector, as is further described in the following paragraphs. Referring to FIG. 2b, in the present embodiment five initialization points in a captured image 30 are selected at: i) the center of the ultrasound probe 36, ii) the center of the captured cross-section 34, iii) the right most edge of the captured cross-section 33, iv) the bottom center edge of the captured cross-section 35, and v) the top most edge of the captured cross-section 32. These five initialization points are typically manually selected by medical staff operating the ultrasound probe and watching the image displayed on a display.

In the alternative, other initialization points may be selected at other locations on the ultrasound probe and the captured cross-section, and more or fewer initialization points may be selected. In the further alternative, the initialization point at the center of the ultrasound probe can be automatically obtained from knowledge of the ultrasound probe parameters obtained from a calibration procedure using known captured images. Such a method is practical since i) it takes very little additional time and ii) ultrasound images are often adjusted by medical personnel to match a calibrated grid using the images of needles or wires in water. In the further alternative, the center of the ultrasound probe can be determined by a number of techniques, such as template matching or a simplified version of the method disclosed in this application to delineate the prostate contour. For example, a seed point approximating the center of the ultrasound probe can be automatically selected at the midpoint of the posterior (lower) boundary of the captured image of FIG. 3. An edge-detector is then applied along the radius emanating from the seed point and the detected edge is then fit to a circle as described in Final Ellipse Fits step below. The initialization point representing the center of the ultrasound probe is then set to the center of the circle. The edge-detector can be an Interacting Multiple Model Probabilistic Data Association (IMMPDA) edge detector as described in the Edge Detection step below, or a simpler algorithm based on a circular model instead of an elliptical model, for example, the method described in P. Abolmaesumi, S. E. Salcudean, W. H. Zhu, M. R. Sirouspour and S. P. DiMaio, "Image Guided Robot for Diagnostic Ultrasound", IEEE Trans. Rob. Aut., 18(1), pp. 11-23, February, 2002, which is incorporated herein by reference.

Step Two—Transformation

The captured cross-section 31 is transformed into an ellipse by applying a warping function to the captured image 30, resulting in a transformed image comprising the transformed captured cross-section (hereinafter referred to as the "transformed cross-section"). The warping function effectively reverses the deformation to the prostate that is caused by the insertion of the ultrasound probe into the patient. The deformation is modeled as originating from the center of the ultrasound probe, such that portions of the prostate that are located closer to the ultrasound probe will experience greater deformation than portions of the prostate that are located farther away from the ultrasound probe. Referring to FIG. 2c, a transformed image 40 is provided comprising: 1) a transformed cross-section 41 transformed from the captured cross-section 31 in FIG. 2b, and 2) warped points 42, 43, 44, 45, transformed from initialization points 32, 33, 34, 35 in FIG. 2b.

In the present embodiment, the warping function is derived assuming that i) the prostate (and the captured cross-section) is symmetrical about the mid-sagittal plane of the patient, and ii) the ultrasound probe is inserted into the patient such that it is symmetric about the mid-sagittal plane. Referring to FIG. 4a, the location of image element 72 in the captured image 70 is represented as a polar coordinate originating from the center of the ultrasound probe 73. Each polar coordinate consists of two elements: 1) a radial distance 74, r, from the center of the ultrasound probe 73, and 2) an angle 75, θ, about the center of the ultrasound probe 73, such that θ=90° corresponds to the mid-sagittal plane and θ=0° and θ=180° correspond to a (coronal) plane perpendicular to the mid-sagittal plane through the center of the ultrasound probe 73. The deformation of the captured cross-section 71 can be reversed by i) stretching the captured image maximally around θ=90° and minimally around θ=0° and θ=180°, and ii) stretching the captured image maximally for small r values and minimally for large r values. These requirements are met by providing a sinusoidal dependence in the angular direction and a Gaussian dependence in the radial direction. The resulting warping function is mathematically represented as:

$$r_W(\theta) = r_C(\theta) - r_C(\theta)\sin(\theta)e^{\frac{-r_C(\theta)^2}{2\sigma^2}} \quad (1)$$

wherein $r_W$, θ are the polar coordinates of image elements or pixels in the transformed image; $r_C$, θ are the polar coordinates of image elements in the captured image; sin is the sine function; e is the exponential function; and σ is a stretch factor representing the degree of radial deformation experienced by the captured cross-section. Small σ values indicate less radial deformation and can be used for prostate shapes that are already elliptical and/or have experienced little deformation by the ultrasound probe. Larger σ values indicate greater radial deformation and can be used for prostate shapes that have experienced more deformation by the ultrasound probe.

Figure 4B:
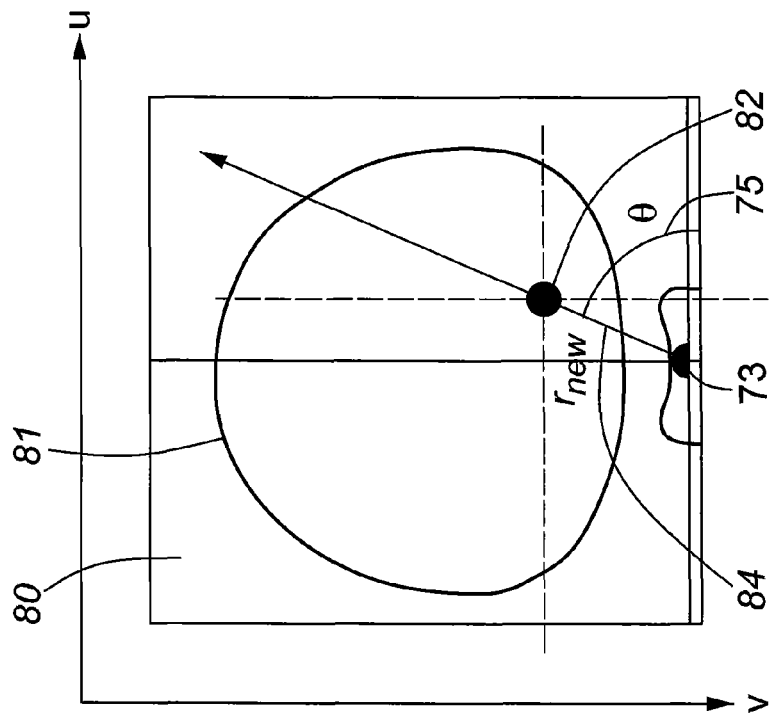
FIG. 4b is a schematic representation of a transformed image of the captured image FIG. 4a with a transformed image element having polar coordinates.
Figure 4A:
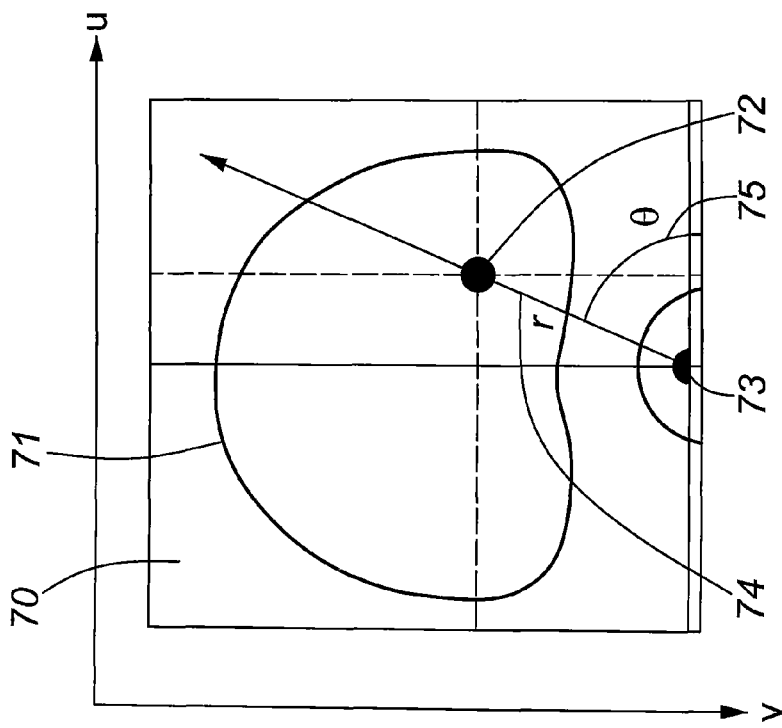
FIG. 4a is a schematic representation of a captured image of a cross-section of a prostate with a captured image element having polar coordinates.

Referring to FIG. 4b, the transformed image 80 resulting from application of the warping function in Equation 1 comprises a transformed cross-section of the prostate 81. The location of image element 72 in the captured image 70 of FIG. 4a is transformed into image element 82 having a new radial distance 84, but the same angular distance 75 since the warping function only stretches image elements along the radial direction.

Figure 5:
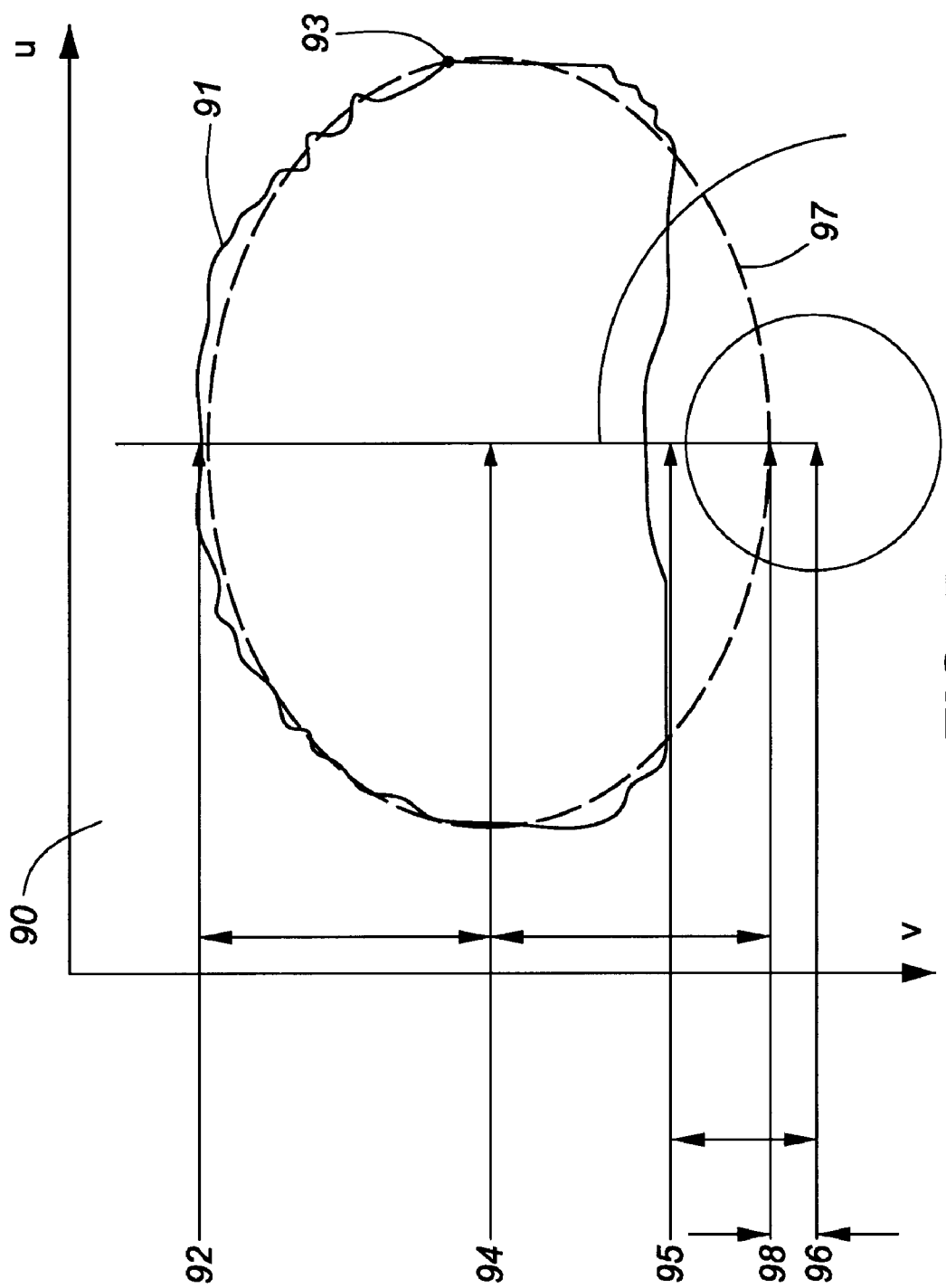
FIG. 5 is a schematic representation of an image containing a captured image of a cross-section of a prostate shown in solid lines and a transformed image of the captured image shown in stippled lines.

The stretch factor σ can be determined by solving Equation (1) for σ as follows:

$$\sigma = \sqrt{\frac{-r_C(\theta)^2}{2\ln\left(\frac{1 - \frac{r_W(\theta)}{r_C(\theta)}}{\sin(\theta)}\right)}} \quad (2)$$

wherein the values for $r_C$, $r_W$ and θ are obtained from the initialization points. Referring to FIG. 5, a captured image 90 is shown comprising a captured cross-section 91 and initialization points at i) the center of the ultrasound probe 96, ii) the center of the captured cross-section 94, iii) the right most edge of the captured cross-section 93, iv) the bottom center edge of the captured cross-section 95, and v) the top most edge of the captured cross-section 92. For the purposes of calculating the stretch factor σ, it is assumed that the deformation caused by the insertion of the ultrasound probe does not significantly affect the portion of the prostate a radial distance beyond the center of the captured cross-section 94. Thus, it is assumed that the location of the center and the radial distance between the center of the captured cross-section 94 and the top of the captured cross-section 92 in the deformed prostate and the non-deformed prostate are the same. In addition, it is also assumed that the cross-section of a non-deformed prostate is an ellipse 97, represented by stippled lines in FIG. 5, that is symmetrical about both the sagittal plane and a (coronal) plane perpendicular to the mid-sagittal plane running through the center of the of the captured cross-section 94. Thus, the radial distance between the bottom center edge of the ellipse 98 and the center of the ellipse 94 is equal to the radial distance between the center of the captured cross-section 94 and the top of the captured cross-section 92 in the deformed prostate. This relationship is represented mathematically as:

$$r_{centre} - r'_{bottom} = r_{top} - r_{centre} \quad (3)$$

or $$r'_{bottom} = r_{top} - 2r_{centre} \quad (4)$$

wherein $r_{center}$ is the radial distance to the center of the captured cross-section 94; $r'_{bottom}$ is the radial distance to the bottom of the ellipse 98; and $r_{top}$ is the radial distance to the top of the captured cross-section 92.

Referring to FIG. 5, a captured image 90 is shown comprising a captured cross-section 91 and initialization points at i) the center of the ultrasound probe 96, ii) the center of the captured cross-section 94, iii) the right most edge of the captured cross-section 93, iv) the bottom center edge of the captured cross-section 95, and v) the top most edge of the captured cross-section 92. For the purposes of calculating the stretch factor σ, it is assumed that the deformation caused by the insertion of the ultrasound probe does not significantly affect the portion of the prostate a radial distance beyond the center of the captured cross-section 91. Thus, it is assumed that the location of the center and the radial distance between the center of the captured cross-section 94 and the top of the captured cross-section 91 in the deformed prostate and the non-deformed prostate are the same. In addition, it is also assumed that the cross-section of a non-deformed prostate is an ellipse 97, represented by stippled lines in FIG. 5, that is symmetrical about both the sagittal plane and a (coronal) plane perpendicular to the mid-sagittal plane running through the center of the of the captured cross-section 95. Thus, the radial distance between the bottom center edge of the ellipse 98 and the center of the ellipse 94 is equal to the radial distance between the center of the captured cross-section 94 and the top of the captured cross-section 91 in the deformed prostate. This relationship is represented mathematically as:

$$r_{centre} - r'_{bottom} = r_{top} - r_{centre} \quad (3)$$

or $$r'_{bottom} = r_{top} - 2r_{centre} \quad (4)$$

wherein $r_{center}$ is the radial distance to the center of the captured cross-section 94; $r'_{bottom}$ is the radial distance to the bottom of the ellipse 98; and $r_{top}$ is the radial distance to the top of the captured cross-section 92.

Since the location of the bottom of the captured cross-section 95 in the captured image 90, $r_{bottom}$, is known and its location in the transformed image 98, $r'_{bottom}$, can be expressed as a function of known initialization points, Equation 2 can be combined with Equation 4 to solve for the stretch factor σ as:

$$\sigma = \sqrt{\frac{-r_{bottom}^2}{2\ln\left(\frac{r_{bottom} - 2r_{centre} + r_{top}}{r_{bottom}}\right)}} \quad (5)$$

In this embodiment, the warping function translates image elements in the captured image towards the center of the ultrasound probe such that 1) image elements that are a closer radial distance to the center of the ultrasound probe are translated a greater radial distance towards the center than image elements that are at a farther radial distance from the center, and 2) image elements that are at a smaller angle to the sagittal axis originating at the center of the ultrasound probe are translated a greater radial distance towards the center than image elements that are a larger angle from the sagittal axis. Other warping functions that achieve the same or similar objectives as the warping function described above will be apparent to one skilled in the art.

Step Three—Initial Ellipse Fit

After transforming the captured image into a transformed image having a transformed cross-section resembling an ellipse, the contour of the transformed cross-section is initially represented as an ellipse ("hereinafter referred to as the "initial edge contour") that is fit to the location of the initialization points as transformed in the transformed image (hereinafter referred to as the "warped points"). Ellipse fitting is ideal for prostate segmentation because the problem of fitting an ellipse to a set of points can be solved by solving a convex numerical optimization problem. The solutions of these problems can be found using computationally inexpensive algorithms that always return a solution when one exists. Methods of ellipse fitting are known in the art. In the present embodiment, an ellipse that fits the warped points is determined by application of the ellipse fitting method disclosed in A. Fitzgibbon, M. Pilu, and R. Fisher, "Direct least square fitting of ellipses", IEEE Trans. Pattern Anal. Mach. Intellig., 21(5): 476-480, 1999, which is incorporated herein by reference. Referring to FIG. 2d, the transformed image 40 in FIG. 2c is provided with an initial edge contour 51 represented by stippled lines.

Step Four—Edge Detection

In many, if not most, captured images of the prostate, the contour of the prostate is unclear. In prior art, captured images have been filtered and an edge detector has been applied to the filtered images in order to find the prostate contour. Filtering is a time consuming operation which typically does not solve the problem of the trajectory of edge detector wandering away from the actual prostate contour due to the lack of prostate contour contrast in the filtered image.

In the present embodiment, computationally expensive pre-filtering is not required. The edge detector is guided and locally confined about the initial edge contour, thereby preventing the trajectory of the edge detector from wandering. Edge detectors are known in the art. In the present embodiment, the edge detector employed is the Interacting Multiple Model Probabilistic Data Association (IMMPDA) edge detector disclosed in P. Abolmaesumi and M. Sirouspour, "An interacting multiple model probabilistic data association filter for cavity boundary extraction from ultrasound images", IEEE Trans. Med. Imaging, 23(6):772-784, 2004 ("Abolmaesumi et al."), which is incorporated herein by reference. The IMMPDA edge detector detects the edge of the transformed cross-section at specific points around the edge of the transformed cross-section while being guided by the initial edge contour. Rays are drawn out from the center of the initial edge contour outward past the edge of the transformed cross-section at a desired angular increment, for example 3 degree increments thus resulting in 120 rays. For each ray, the intensity of each image element or pixel in the transformed image is measured along the ray between a minimum radial distance, $r_{min}$, and a maximum radial distance, $r_{max}$. The radial distances are defined to fall on either side of the initial edge contour along the ray.

Figure 2F:
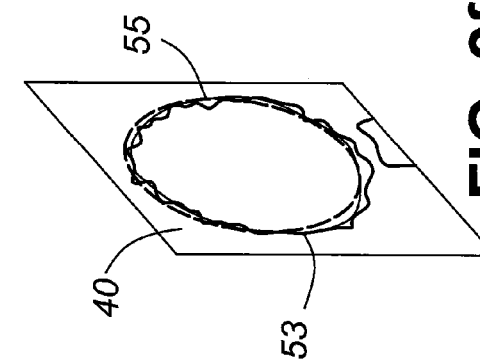
FIG. 2f is a perspective schematic view of the transformed image shown in FIG. 2c with a final ellipse fit to the detected edge shown in stippled lines over top of the detected edge of FIG. 2e shown in solid lines.
Figure 2E:
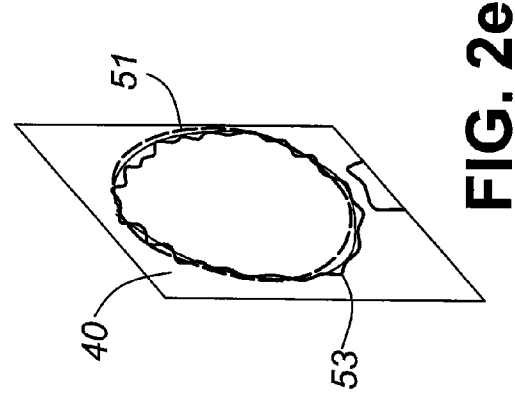
FIG. 2e is a perspective schematic view of the transformed image shown in FIG. 2c with a detected edge shown in solid lines over top of the initial ellipse fit of FIG. 2d shown in stippled lines.

For each ray, the five greatest absolute gradient values are used as candidate points for the edge of the transformed cross-section. A weight is then assigned to each candidate point. In the present embodiment, the weights are assigned by Probabilistic Data Association Filters (PDAF) such as those disclosed in Abolmaesumi et al. The weighted average value is used as a measurement value for the transformed cross-section edge along the ray. The actual edge of the transformed cross-section along the ray is determined using i) the measurement value along the ray, and ii) the actual edge of the transformed cross-section determined for the previous ray (except for the initial ray). These two values are used in a Kalman Filter with Interacting Multiple Models (IMM) and a constant velocity model to find the actual edge of the transformed cross-section along the ray, as described in Abolmaesumi et al. Referring to FIG. 2e, the transformed image 40 in FIG. 2c is provided with a detected edge 53 represented in a dark line overtop of the initial edge contour 51 represented by stippled lines.

In the alternative, a median filter can be applied to the candidate points along the ray to provide radial smoothing. For example, a median filter of length 5 can be used to provide radial smoothing such that the median of each pixel along a ray and the two pixels before and after are taken. Such filtering can assist in reducing the false edge detection caused by speckles in the transformed image.

Step Five—Final Ellipse Fit

A more accurate estimate of the contour of the transformed cross-section (hereinafter referred to as the "final edge contour") is determined by fitting a second ellipse to the detected edge of the transformed cross-section. The method for fitting the ellipse to the detected edge of the transformed cross-section is identical to the method used in the Initial Ellipse Fit step to fit an ellipse to the warped points. Referring to FIG. 2f, the transformed image 40 in FIG. 2c is provided with a final edge contour 55 represented in stippled lines overtop of the detected edge 53.

Step Six—Inverse Transformation

The final step in the automated segmentation method of the present embodiment is the application of the inverse of the transformation applied in the Transformation step above to the final edge contour such that it represents the contour of the captured cross section in the original captured image. Referring to FIG. 2g, a final image 60 is provided with the contour of the captured image 61 shown in dark lines overtop of the final edge contour 55 represented in stippled lines and the actual contour of the captured cross-section 31 from FIG. 2b.

Three-Dimensional Method

In prostate brachytherapy a volume study of the prostate is taken in which 10-14 two-dimensional captured images are taken at 5 mm increments along the longitudinal axis of the prostate and by imaging techniques known in the art. The contour of the prostate in each captured image is determined in order to create the planning treatment volume. Although the prostate contour is more easily delineated on the mid-gland captured images, it is difficult to delineate at the base and apex due to blending with the bladder neck and pelvic floor, respectively.

In another embodiment, the two-dimensional automated segmentation method described previously can be adapted to apply to a set of captured images defining a segmented volume of a prostate, such as those taken in a volume study during prostate brachytherapy. Segmentation of the prostate at the apex and base is achieved by extrapolating from the contours determined for captured images in which the prostate can be more easily delineated. The method is further described below.

Step One—Initialization

A first captured image is selected by an operator from the set of two-dimensional captured images representing a mid-gland cross-section of the prostate. The first captured image is used for two purposes: 1) to determine a warping function that is applied to all of the captured images in the set of captured images, except the apex and base captured images; and 2) to serve as an initial edge contour for adjacent captured images in the set of captured images. To determine the warping function, a set of five initialization points are selected from the first captured image in the same manner and at the same locations as described in the two-dimensional automated segmentation method above.

Step Two—Transformation

The initialization points for the first captured image are used to define the warping function in the same manner as described in the two-dimensional automated segmentation method above. The warping function is then applied to the set of captured images, resulting in a set of corresponding transformed images. The transformed image corresponding to the first captured image is referred to as the "first transformed image".

In the alternative, a different warping function can be applied to each captured image, for example, the stretch factor applied to each captured image can be determined by the properties of the first captured image and the stretch factor calculated for the first captured image. In the further alternative, the warping function can be applied to only a subset of the captured images, for example, for a large prostate with relatively little deformation at the mid-gland it may only be necessary to transform a few of the captured images. In the further alternative, the warping function may be tapered from the mid-gland to the apex and the mid-gland to the base. For example, the stretch factor can be decreased through a linear or non-linear but monotonic interpolation so that there is no warping at the base and apex of the prostate.

Step Three—Segmentation of First Captured Image

Next, the final edge contour of the transformed cross-section of the first transformed image is determined by applying the Initial Ellipse Fit, Edge Detection and Final Ellipse Fit steps described in the two-dimensional automated segmentation method above.

Step Four—Segmentation of Remaining Captured Images

The final edge contours of the remaining transformed images in the set of transformed images are determined in a recursive manner. For each transformed image, the initial edge contour for the transformed image is defined as the final edge contour determined for an adjacent transformed image in the set of transformed images, in a direction towards the first transformed image. Specifically, if the index of the first transformed image in the set of transformed images is M, then the final edge contour of transformed image M is used as the initial edge contour for transformed images with indexes M−1 and M+1. For each of the transformed images M−1 and M+1 a final edge contour is determined by applying the Edge Detection and Final Ellipse Fit steps described in the two-dimensional automated segmentation method above. The final edge contour for transformed image M−1 is used as the initial edge contour for transformed image M−2 and the final edge contour for transformed image M+1 is used as the initial edge contour for transformed image M+2. Similarly, for each of the transformed images M−2 and M+2 a final edge contour is determined by applying the Edge Detection and Final Ellipse Fit steps described in the two-dimensional automated segmentation method above. This process is repeated until the final edge contour is determined for the transformed images immediately adjacent to the apex and the base of the prostate. The final edge contour for the apex and base transformed images is determined in a later step described below.

In the alternative, a bias can be placed on $r_{min}$ and $r_{max}$ to force the edge detector to search closer to the center of the prostate as edge detection is performed on transformed images further and further away from the first transformed image in the set of transformed images. This bias is justified since the prostate is assumed to have an ellipsoidal shape, thus the radius of each ellipse should get smaller as the apex and base are approached from the mid-gland.

Step Five—Initial Ellipsoid Fit

Figure 6:
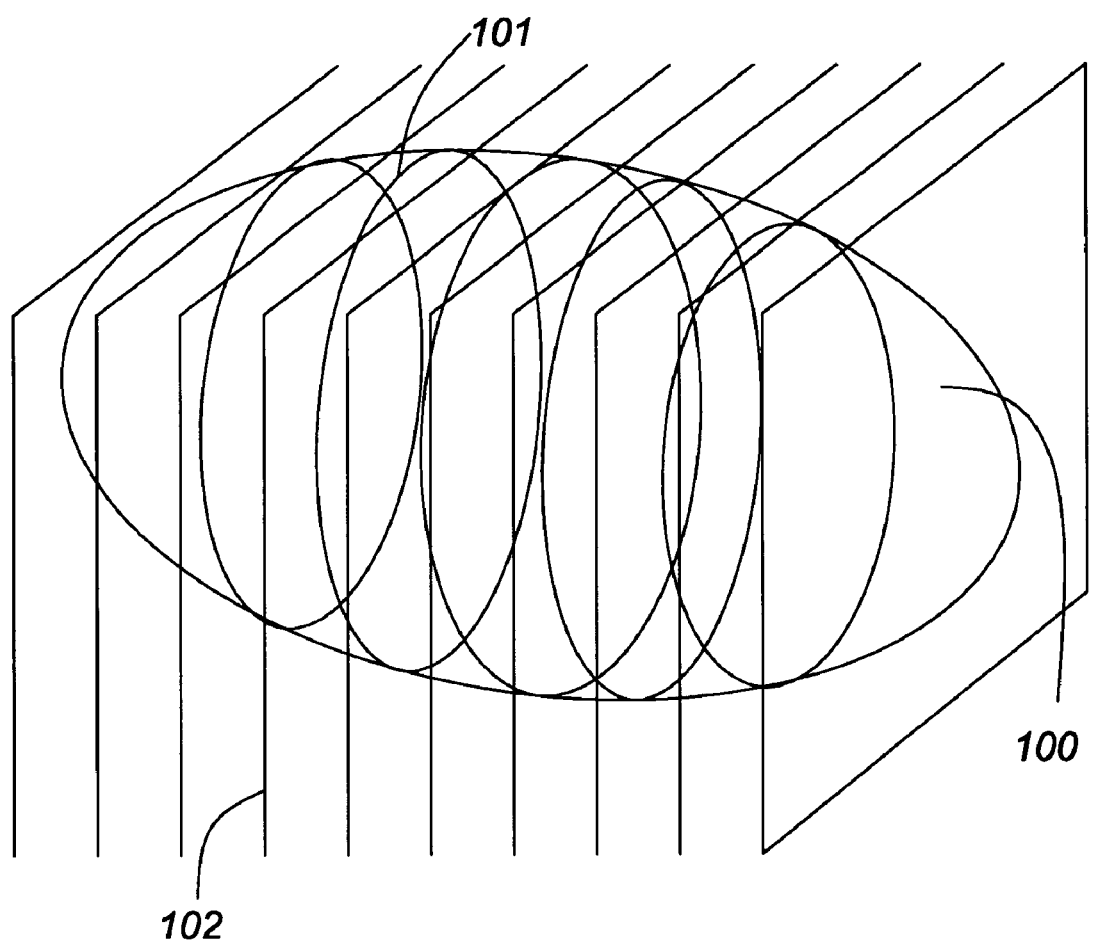
FIG. 6 is a perspective view of an ellipsoid fit to the contours of a set of transformed images.

As discussed above, the contour of the prostate in cross-sections at the base and apex is difficult to identify due to blending with the bladder neck and pelvic floor, respectively. In order to approximate the contour of the apex and base transformed images, the volume of the prostate is modeled as an ellipsoid. An ellipsoid is fit to the final edge contours determined for the set of transformed images. Similar to ellipse fitting, ellipsoid fitting is ideal for prostate segmentation because the problem of fitting an ellipsoid to a set of final edge contours can be solved by solving a convex numerical optimization problem. The solutions of these problems can be found using computationally inexpensive algorithms that always return a solution when one exists. Methods of ellipsoid fitting are know in the art. In the present embodiment, an ellipsoid is fit to the final edge contours determined for the set of transformed images by the method disclosed in Q. Li and J. G. Griffiths, "Least squares ellipsoid specific fitting", In Proc. Geometric Modeling and Processing/IEEE Comp Soc, 2004, which is incorporated herein by reference. Alternative methods of fitting an ellipsoid to set of data points are known to those skilled in the art, for example, "Convex Optimization, Boyd and Vanderverghe, Convex Optimization, Cambridge University Press, 2004. Referring to FIG. 6, an ellipsoid 100 is provided that is fit to the final edge contours 101 of a set of transformed images 102.

Step Six—Segmentation of Apex and Base

Next we find the intersection of the ellipsoid's superior-inferior axis with the base and apex captured cross-sections.

It should be noted that the boundary of the prostate is very difficult to recognize at the base and apex. Manual segmentation is typically just an educated guess as to where the prostate is based on experience and knowledge from the previous contours.

It has been determined through a number of patient studies that a good ellipsoid fit can be achieved in a majority of patients by defining the base and apex contours as circles of radii $R_{base}$=18 mm and $R_{apex}$=15 mm, respectively, centered along the ellipsoid's superior-inferior axis. In the alternative, the base and apex radii can be selected to have a prostate size dependency. For example, the values of $R_{base}$ and $R_{apex}$ can be scaled linearly with the square root of the area of the midgland captured cross-section, or the values of $R_{base}$ and $R_{apex}$ could be scaled linearly with the cubic root of the volume of the prostate calculated in the Initial Ellipsoid Fit step above.

Step Seven—Final Ellipsoid Fit

At this point a final edge contour has been determined for every transformed image in the set of transformed images, including the base and apex transformed images. A final ellipsoid is fit to all of the final edge contours to provide an ellipsoid representation of the warped prostate volume. The ellipsoid fitting method disclosed in the Initial Ellipsoid Fit step described above is also used for this purpose.

Step Eight—Inverse Transformation

Figure 8:
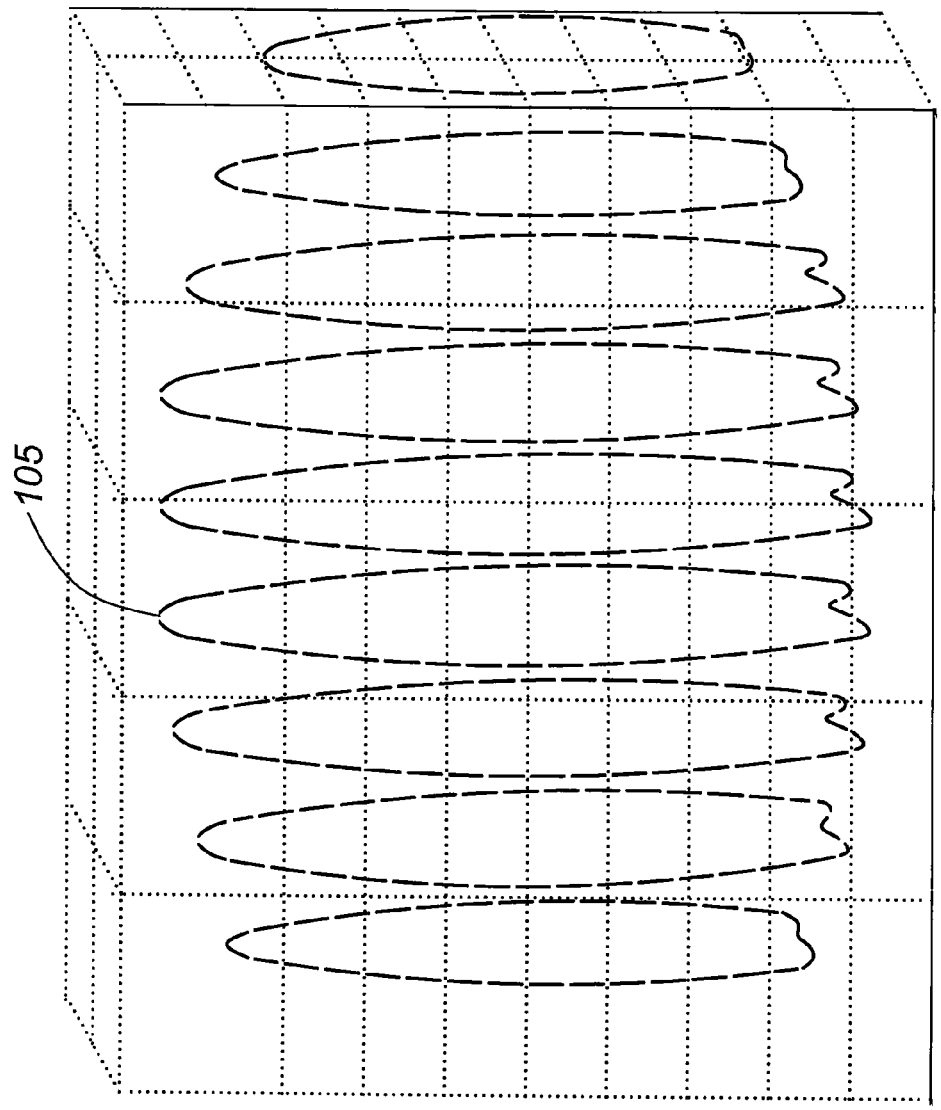
FIG. 8 is a perspective view of a set of contours of a set of captured images determined according to the three-dimensional automated segmentation shown in FIG. 7.

In order to determine the contour of the set of captured images, the final ellipsoid is segmented into a set of transverse cross-sections (hereinafter referred to as "refined edge contours") spaced apart at the same distance as the captured images in the set of captured images. The inverse of the transformation applied in the Transformation step described above is applied to each of the refined edge contours, resulting in a set of smooth, continuous contours of the captured cross-sections of the prostate in the set of captured images. Referring to FIG. 8, a set of contours of the captured cross-sections 105 is provided.

In the alternative, the final ellipsoid can be segmented into a set of transverse cross-sections spaced apart at distances other than distances for which the captured images in the set of captured images are spaced apart.

Operation of Two-Dimensional and Three-Dimensional Methods

Both the two-dimensional and three-dimensional automated segmentation methods can be encoded and incorporated into a program that processes captured images captured by an ultrasound probe. The program can be stored on a computer readable medium or memory that is used by a computer in an ultrasound system.

Figure 1:
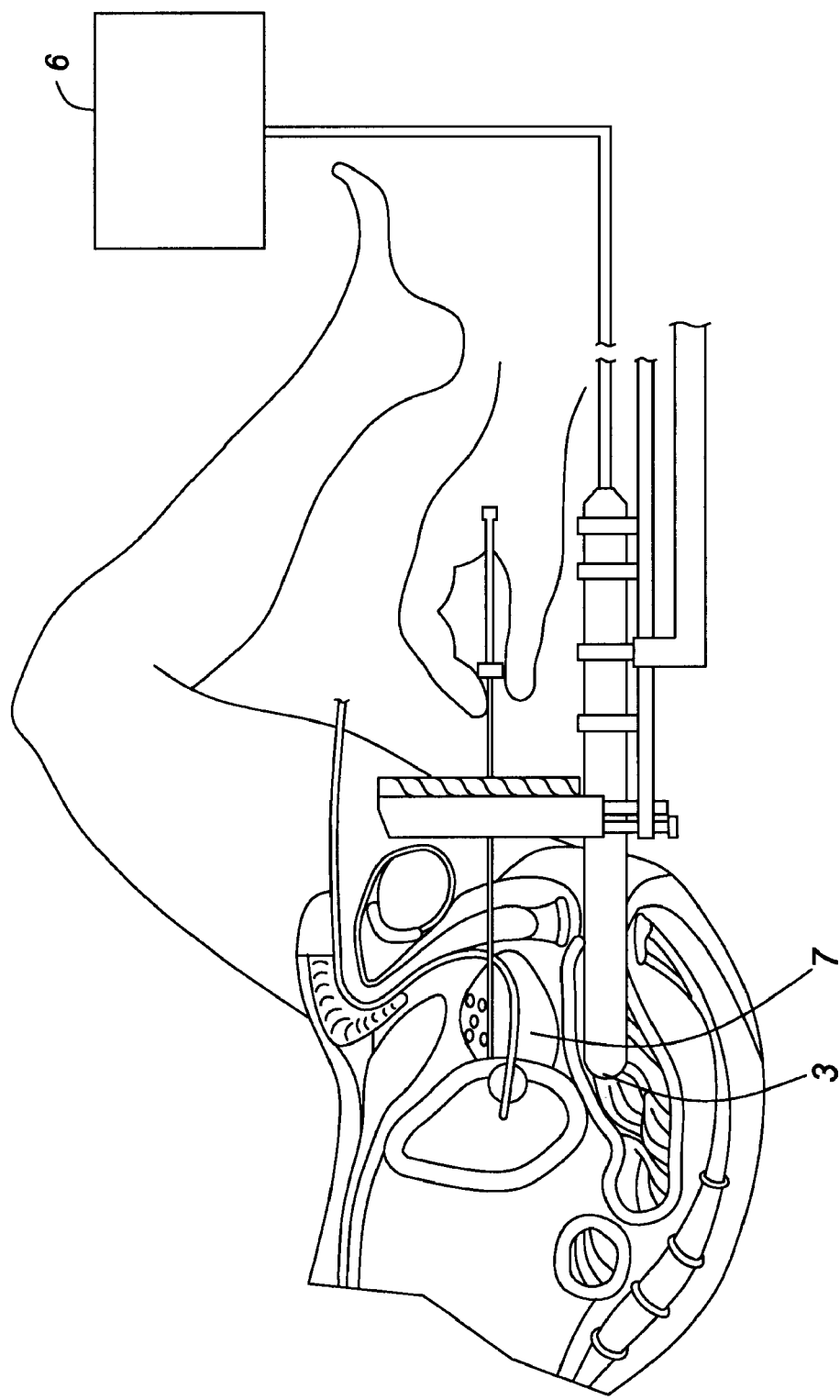
FIG. 1 is a diagram of an apparatus for obtaining a segmented image of a prostate organ in use with a patient, according to one embodiment of the invention.

Referring to FIG. 1, a system for automated segmentation of a prostate organ 7 in a captured image generally comprises an ultrasound probe 3 and an ultrasound machine 6 communicative with the ultrasound probe 3. The probe 3 operates to capture transverse trans-rectal ultrasound (TRUS) images of the prostate 7. In the alternative, the probe can operate to capture axial images of the prostate via an axial/sagittal array, and 3D ultrasound images are acquired which are then re-sampled to generate 2-D transverse slices. The probe 3 is known in the art and can be for example a BK Medical Type 8658 or 8848 Transducers, a Siemens Endo-PII transducer, or a GE Healthcare ERB.

The ultrasound machine 6 is communicative with the probe 3 to receive captured images as they are captured by the probe 3. The ultrasound machine is known in the art and can be for example a BK Medical Pro Focus 2202, a Siemens Sonoline Prima, or a GE Healthcare Logiq 5. The ultrasound machine 6 comprises a memory, a display, a processor and an input device. The memory stores a program and the images received from the probe 3. The program is an expression of the steps of the two-dimensional and three-dimensional automated segmentation methods described above. The processor executes the program to apply a selected automated segmentation method to the captured images received from the probe 3. The display displays the captured images received from the probe 3 as well as the contours of the captured cross-sections determined by performing the automated segmentation method. The input device allows a user to initiate and provide information required by the automated segmentation method. Suitable input devices are known in the art and can be for example a standard computer keyboard and computer mouse. In the alternative, a general purpose computer communicative with the ultrasound machine may execute all or portions of the program in place of the ultrasound machine 6.

In operation, the probe 3 is inserted into the rectum of a patient by an oncologist. The oncologist positions the probe 3 at the base of the prostate 7 by examining the transverse images from of the probe 3. The probe 3 is placed on a brachytherapy "stepper", a device that allows controlled translation in the axial direction of the probe, as well as rotation of the TRUS about its longitudinal axis. The stepper is placed on a coarse positioning device that allows the probe 3 to be translated and rotated in order to be placed below the prostate, with the probe axis in the mid-sagittal plane dividing the prostate in two roughly equal left and right parts. The oncologist adjusts the probe 3 using the stepper until the transverse image just captures the base of the prostate. This transverse image is called the base image. The ultrasound transducer is then "stepped" towards the apex of the prostate and captures a set of 10-14 captured images taken at 5 mm increments along the entire length of the prostate 7. In the alternative, smaller or larger step increments may also be taken resulting in a smaller or larger number of slices. The set of captured images are then transferred to the ultrasound machine 6 for processing. The ultrasound machine 6 then stores the captured images to its memory and executes the program.

Application of Two-Dimensional Method

In one embodiment, the program contains the steps of the two-dimensional segmentation method described above. Referring to FIG. 2a, a process diagram of the steps contained in the programming code is provided. First, the oncologist selects a captured image 20 from the set of captured images. In step 21, the system displays the captured image on the display and prompts the oncologist to select a series of initialization points at i) the center of the ultrasound probe, ii) the center of the captured cross-section, iii) the right most edge of the captured cross-section, iv) the bottom center edge of the captured cross-section, and v) the top most edge of the captured cross-section. The oncologist selects these points using the input device.

In step 22, the system calculates the stretch factor and derives the warping function as described in the two-dimensional automated segmentation method above. The warping function is then applied to the captured image, resulting in a transformed image that is stored in the computer's memory.

In step 23, the system calculates an initial edge contour of the transformed cross-section by applying an ellipse fit to the locations of the warped points in the transformed image, as described in the two-dimensional automated segmentation method above.

In step 24, the system detects the edge of the transformed cross-section by applying the edge detector as described in the two-dimensional automated segmentation method above.

In step 25, the system calculates a final edge contour of the transformed cross-section by applying an ellipse fit to the detected edge determined in step 24, in a similar manner as applied to the warped points in step 23.

In step 26, the system solves for the contour 27 of the captured image by applying the inverse of the warping function derived in step 22 to the final edge contour. The system then displays the contour 27 of the captured image on the display. The contour 27 is imported into another program, in which (i) the radiation oncologist can edit the result, if necessary, (ii) the oncologist plans a treatment by designing a set of needle implants that will generate a dose distribution conforming to treatment standards that specify dose coverage, minimal dose, dose conformity, etc. The program is know in the art and may be for example the program used in products such as VeriSeed by Varian. The prostate segmentation method is sufficiently computationally efficient such that it will not be a bottle neck for intra-operative planning, the process by which the imaging of the prostate gland. Thus, the planning of the treatment, or the changes of a treatment plan designed pre-operatively, can be carried out intra-operatively.

Application of Three-Dimensional Method

Figure 7:
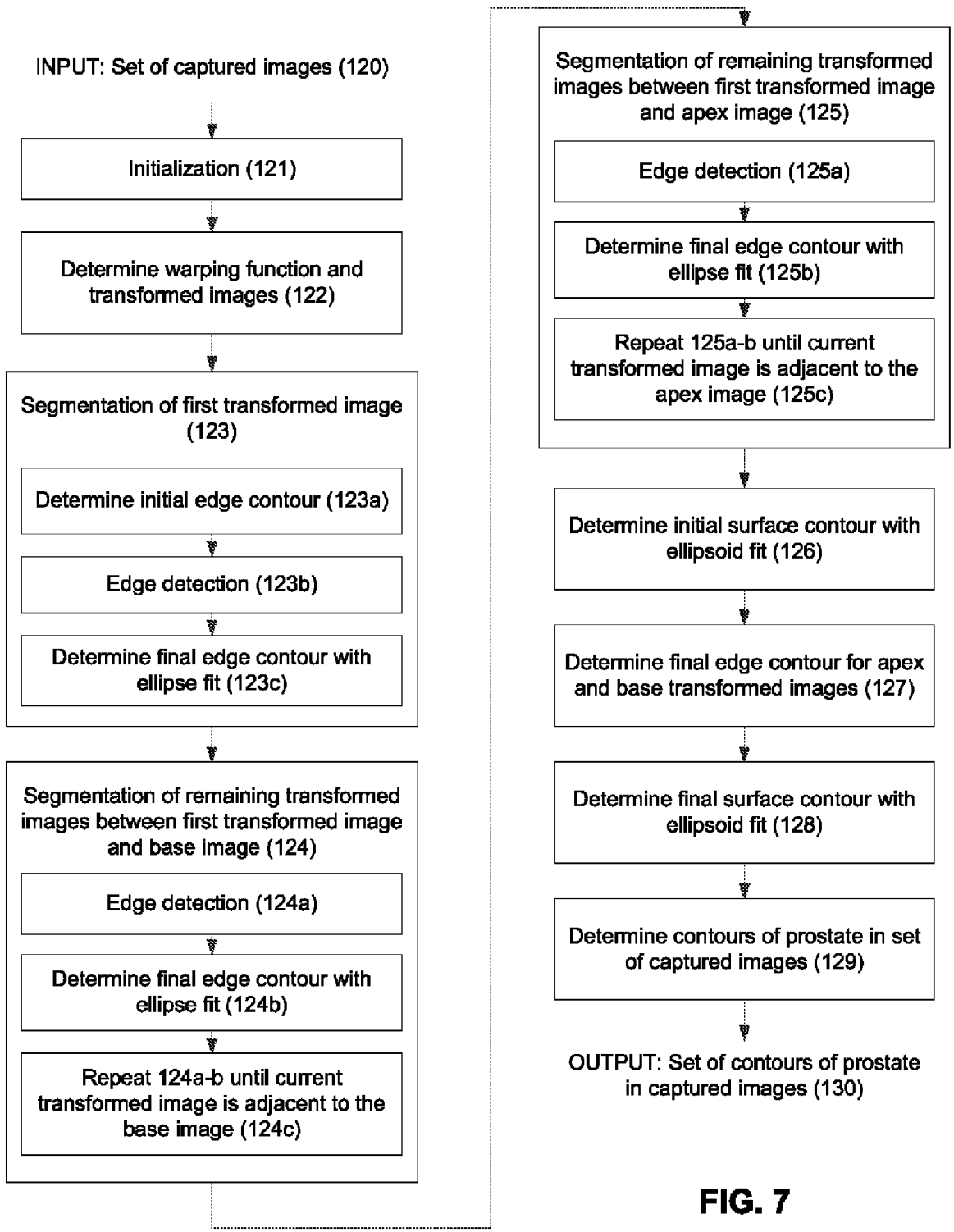
FIG. 7 is a process diagram of a three-dimensional automated segmentation method for imaging a prostate, according to another embodiment of the invention.

In another embodiment, the program contains the steps of the three-dimensional segmentation method described above. Referring to FIG. 7, a process diagram of the steps contained in the program is provided. First, the oncologist selects a set of captured images 120. In step 121, the system prompts the oncologist to select a first captured image from the set of captured images 120. Once the first captured image is selected the system displays the first captured image on the display and prompts the oncologist to select a series of initialization points at i) the center of the ultrasound probe, ii) the center of the captured cross-section, iii) the right most edge of the captured cross-section, iv) the bottom center edge of the captured cross-section, and v) the top most edge of the captured cross-section. The oncologist selects these points using the input device.

In step 122, the system calculates the stretch factor and derives the warping function using the first captured image, as described in the three-dimensional automated segmentation method above. The warping function is then applied to all of the images in the set of captured image, resulting in a set of transformed images that are stored in the computer's memory.

In step 123, the system segments the first transformed image. In step 123a, the system calculates an initial edge contour of the transformed cross-section of the first transformed image by applying an ellipse fit to the locations of the warped points in the first transformed image, as described in the three-dimensional automated segmentation method above. In step 123b, the system detects the edge of the transformed cross-section by applying the edge detector described in the three-dimensional automated segmentation method above. In step 123c, the system calculates a final edge contour of the transformed cross-section by applying an ellipse fit to the detected edge determined in step 123b, in a similar manner as applied to the warped points in step 123a.

In step 124, the system recursively segments the transformed images located between the first transformed image and the base transformed image in the set of transformed images, starting with the transformed image immediately adjacent to the first transformed image. In step 124a, the system detects the edge of the transformed cross-section of the current transformed image by applying the edge detector described in the three-dimensional automated segmentation method above. In step 124b, the system calculates a final edge contour of the transformed cross-section of the current transformed image by applying an ellipse fit to the detected edge determined in step 124a, in a similar manner as applied to the warped points in step 123a. In step 124c, the system determines if the current transformed image is the transformed image adjacent to the base transformed image in the set of transformed images. If yes, then the system progresses to step 125; if, no, then the system selects the next transformed image in the set of transformed images in a direction towards the base transformed image and repeats steps 124a to 124c for this next transformed image.

In step 125, the system recursively segments the transformed images located between the first transformed image and the apex transformed image in the set of transformed images, starting with the transformed image immediately adjacent to the first transformed image. In step 125a, the system detects the edge of the transformed cross-section of the current transformed image by applying the edge detector described in the three-dimensional automated segmentation method above. In step 125b, the system calculates a final edge contour of the transformed cross-section of the current transformed image by applying an ellipse fit to the detected edge determined in step 125a, in a similar manner as applied to the warped points in step 123a. In step 125c, the system determines if the current transformed image is the transformed image adjacent to the apex transformed image in the set of transformed images. If yes, then the system progresses to step 126; if no, then the system selects the next transformed image in the set of transformed images in a direction towards the apex transformed image and repeats steps 125a to 125c for this next transformed image.

In step 126, the system calculates an initial surface contour by fitting an ellipsoid to the final edge contours associated with the set of transformed images, as described in the three-dimensional automated segmentation method above.

In step 127, the system calculates the final edge contour for the apex and base transformed images as circles of radii $R_{base}$ and $R_{apex}$ as described above, with these circles being centered in the base and apex planes at the intersection of the ellipsoid major axis with the base and apex planes.

In step 128, the system calculates a final surface contour by fitting an ellipsoid to the final edge contour calculated for the apex and base transformed images and the final edge contours associated with the set of transformed images, as described in the three-dimensional automated segmentation method above.

In step 129, the system solves for the contours 130 of the set of captured images by first segmenting the final surface contour into cross-sections spaced apart along the length of the prostate the same distance as between the captured images in the set of captured images 120. The system then applies the inverse of the warping function derived in step 122 to the segmented images, resulting in a set of contours 130 of the prostate. The system then displays the contour 130 of the captured image on the display The contours 130 are imported into another program, in which (i) the radiation oncologist can edit the result, if necessary, (ii) the oncologist plans a treatment by designing a set of needle implants that will generate a dose distribution conforming to treatment standards that specify dose coverage, minimal dose, dose conformity, etc. The program is know in the art and may be for example the program used in products such as VeriSeed by Varian. The prostate segmentation method is sufficiently computationally efficient such that it will not be a bottle neck for intra-operative planning, the process by which the imaging of the prostate gland. Thus, the planning of the treatment, or the changes of a treatment plan designed pre-operatively, can be carried out intra-operatively.

ALTERNATIVE EMBODIMENTS

Non-Ellipse/Ellipsoid Shape

In the embodiments described thus far the prostate is assumed to have an elliptical/ellipsoidal shape in the absence of deformation due to the insertion of an ultrasound probe. Modeling the prostate as an ellipse/ellipsoid is generally a reasonable approximation for a large number of patients. However, for patients with prostates having a non-elliptical/ellipsoidal shape, the quality of the segmentation may be increased by modeling the prostate as the non-elliptical/ellipsoidal shape.

In an alternative embodiment, the two-dimensional automated segmentation method is modified to model and detect the edge of the captured cross-section of a captured image assuming that the captured cross-section has a non-elliptical shape when not deformed by the insertion of an ultrasound probe into a patient. Specifically, the two-dimensional automated segmentation method is modified such that: 1) the captured cross-section is transformed to a transformed cross-section resembling the non-elliptical shape; 2) the initial edge contour is determined by fitting the non-elliptical shape to the transformed cross-section; 3) the edge of the transformed cross-section is detected by guiding an edge detector about the non-elliptical initial edge contour; 4) the final edge contour is determined by fitting the non-elliptical shape to the detected edge of the transformed cross-section; and 5) the contour of the captured cross-section is determined by applying the inverse of the transformation to the final edge contour. For example, a cross-section of the prostate can be assumed to be symmetric with respect to the middle axis of the prostate and the sides of the cross-section can be approximated by symmetrical sideways parabolas.

In a further alternative embodiment, the three-dimensional automated segmentation method is modified to model and detect the edge of the captured cross-sections of a set of captured images assuming that the prostate has a non-ellipsoidal shape when not deformed by the insertion of an ultrasound probe into a patient. Such modifications will be apparent to one skilled in the art in light of the modifications to the two-dimensional automated segmentation method described in the preceding embodiment.

As discussed above, modeling the prostate as an ellipse/ellipsoid provides computational advantages. In an alternative embodiment, a captured cross-section of a prostate, which has a non-elliptical shape when not deformed by the insertion of an ultrasound probe into a patient, is transformed to resemble an elliptical shape. The two-dimensional automated segmentation method described above is applied to the captured cross-section using a warping function that achieves such a transformation.

In a further alternative embodiment, a set of captured cross-sections of a prostate, which has a non-ellipsoidal shape when not deformed by the insertion of an ultrasound probe into a patient, are transformed to resemble an ellipsoidal shape. The three-dimensional automated segmentation method described above is then applied to the captured cross-sections using a warping function that achieves such a transformation. For example, for a prostate having an egg-like shape, wherein the cross-section of around the base is larger than the cross-section around the apex, the three-dimensional automated segmentation method can be modified by defining a warping function that applies a larger scale to captured cross-sections near the base and a smaller scale to captured cross-sections near the apex. If a smooth statistical prostate shape is used, such a shape can be best fit by an ellipsoid, and a warping would be defined which deforms the statistical shape into the ellipsoid.

In another example, the three-dimensional automated segmentation method is applied to a prostate having a tapered or bean shaped cross-section and a 3D volume more similar to that of an egg, usually becoming narrower near the apex. The 3D tapering of the volume is particularly seen in cases where the mid-gland image is not located exactly in the middle of the base and apex positions. In the Initialization step, six points are selected from the mid-gland image located at: i) the center of the ultrasound probe, ii) the center of the captured cross-section, iii) the right most edge of the captured cross-section, iv) the bottom center edge of the captured cross-section, v) the top most edge of the captured cross-section, and vi) the bottom right most edge of the captured cross-section. The last point is required to model the more complex tapered shape of the captured cross-section. The user also selects the base and apex planes in the prostate volume. The mid-gland plane, the base plane and the apex plane are used to account for the tapering of the prostate volume.

The warping function is determined and applied to the set of captured images in the same manner as described in the two-dimensional automated segmentation method above, resulting in a set of transformed images each having a transformed cross-section. The transformed cross-sections are then un-tapered by the application of an un-tapering function to the set of transformed images, resulting in a set of un-tapered images each having an elliptical cross-section. The un-tapering is applied in a linearly decreasing manner such that maximum un-tapering is applied to the mid-gland image and zero un-tapering is applied to the base and apex images. For each captured image, the warping function reverses the deformation introduced by the insertion of the ultrasound probe into the patient, and the un-tapering function transforms the tapered transformed cross-section to resemble an ellipse. Once the un-tapered function is determined and applied to the set of transformed images, the remaining steps of the three-dimensional automated segmentation method are carried out except that (i) a different method for detection of the initial edge contours is used, (ii) the base and apex contours are not used and (iii) a tapered ellipsoid is fitted instead of an ellipsoid. In order to determine the initial edge contours for the remaining captured images, the final edge contour of the mid-gland image along with the initial user selected base and apex planes are used to fit two semi-ellipsoids to each half (from the mid-gland towards the base and mid-gland towards the apex) using the convex method described in the three-dimensional segmentation method. These semi-ellipsoids are segmented into transverse cross-sections spaced apart at the same distance as the captured images to generate initial edge contours for the remaining captured images. The similar IMMPDA edge detection and final edge contour fitting described in the two-dimensional automated segmentation method is then carried out. A tapered ellipsoid or an egg shape is then fitted to the final edge contours. In the Inverse Transformation step, the tapered ellipsoid is segmented into a set of transverse cross-sections spaced apart at the same distance as the captured images in the set of captured images. The inverse of the un-tapering function and the inverse of the warping function are applied to each of the segmented cross-sections, resulting in a set of smooth, continuous contours of the captured cross-sections of the prostate in the set of captured images.

A tapered ellipse can be represented mathematically as:

$$\left(\frac{x'}{a_x}\right)^2 + \left(\frac{y'}{a_y}\right)^2 = 1, \tag{6}$$

$$x' = \left(\frac{ty}{a_y} + 1\right)x\cos(\theta) - y\sin(\theta) + x_0,$$

$$y' = \left(\frac{ty}{a_y} + 1\right)x\sin(\theta) - y\cos(\theta) + y_0$$

where $a_x$ and $a_y$ are the major and minor axes; $(x_0, y_0)$ is the center point of the shape; $\theta$ is the amount of rotation about the center point; and t, $0 \leq t \leq 1$ is the tapering value. Assuming symmetry about the mid-sagittal plane, that is, no rotation about the center point, Equation 6 reduces to:

$$\left(\frac{x'}{a_x}\right)^2 + \left(\frac{y'}{a_y}\right)^2 = 1, \tag{7}$$

$$x' = \left(\frac{ty}{a_y} + 1\right)x + x_0,$$

$$y' = y + y_0$$

The tapered ellipse is fitted to the initialization points after being warped by the warping function and their mid-sagittal symmetries using the Levenberg-Marquardt optimization method disclosed in K. Levenberg, "A method for the solution of certain problems in least squares", *Quart. Appl. Math.*, 1944, Vol. 2, pp. 164-168 and D. Marquardt, "An algorithm for least-squares estimation of nonlinear parameters", *SIAM J. Appl. Math.*, 1963, Vol. 11, pp. 431-441, which are incorporated herein by reference. The goal of the Levenberg-Marquardt optimization method is to fit the tapered ellipse having parameters $P=(x_0, y_0, a_x, a_y, t)$ to the warped initial points and their mid-sagittal symmetries such that $e^T e$ in the following equation is minimized:

$$\min_P e^T e, \ e_i = \sqrt{a_x a_y}\,(f(x_i, y_i, P) - 1), \tag{8}$$

$$f(x, y, P) = \left[\left(\frac{ty'}{a_y} + 1\right)^{-1}\frac{x'}{a_x}\right]^2 + \left[\frac{y'}{a_y}\right]^2,$$

$$x' = (x - x_0),$$

$$y' = (y - y_0)$$

wherein $x_i$, $y_i$ are set as the position of the warped initial points and their mid-sagittal symmetries.

The parameters, P, solved from Equation 8 are then used to apply the un-tapering on the transformed image using the un-tapering function expressed mathematically as:

$$x' = \left(\frac{-t}{a_y}(y - y_0) + 1\right)(x - x_0), \tag{9}$$

$$y' = y - y_0$$

wherein x, y represent the Cartesian coordinates of an image element or pixel in the transformed image and x', y' represent the Cartesian coordinates of the image element or pixel in the un-tapered image.

A tapered ellipsoid can be represented mathematically as:

$$\left(\frac{x'}{a_x}\right)^2 + \left(\frac{y'}{a_y}\right)^2 + \left(\frac{z'}{a_z}\right)^2 = 1 \tag{10}$$

$$x' = \left(\frac{t_1 y}{a_y} + 1\right)\left(\frac{t_3 z}{a_z} + 1\right)x + x_0$$

$$y' = \left(\frac{t_2 z}{a_z} + 1\right)y + y_0$$

$$z' = z + z_0$$

where $t_1$, $t_2$, $t_3$ are tapering about each of the three orthogonal axes, $(x_0, y_0, z_0)$ is the center of the shape and $a_x$, $a_y$, $a_z$ are the semi-axes. Through selection of appropriate parameters, Equation 10 can describe a shape similar to that of an egg with a tapered elliptical cross-section. It is assumed that no rotation is present, that is, the main axis of the tapered ellipsoid is aligned with the ultrasound probe.

In order to fit a tapered ellipsoid to set to points the Levenberg-Marquardt optimization method is used with the goal of obtaining the parameters $P=(x_0, y_0, z_0, a_x, a_y, a_z, t_1, t_2, t_3)$ such that the following error is minimized:

$$\min_P e^T e, \ e = \sqrt{a_x a_y a_z}\,(f(x_i, y_i, z_i, P) - 1) \tag{11}$$

$$f(x, y, z, P) = \left[\frac{x'}{a_x}\right]^2 + \left[\frac{y'}{a_y}\right]^2 + \left[\frac{z'}{a_z}\right]^2$$

$$x' = (x - x_0) \bigg/ \left[\left(\frac{t_3}{a_z}(z - z_0) + 1\right) \times \left(\frac{t_1}{a_y}\left(\frac{y - y_0}{\frac{t_2}{a_z}(z - z_0) + 1}\right) + 1\right)\right]$$

$$y' = (y - y_0) \bigg/ \left(\frac{t_2}{a_z}(z - z_0) + 1\right)$$

$$z' = (z - z_0)$$

in which $x_i$, $y_i$, $z_i$ are the positions of the contour points. Since the captured images are transformed to ellipses, we assume $t_1=0$ to maintain an elliptical cross-section.

Since the tapered ellipsoid fitting is no longer a convex problem, optimization duration is a problem. Additionally, the iterative Levenberg-Marquardt algorithm is sensitive to its initial points. In order to guide this algorithm, after 2D segmentation of all captured images, an ellipsoid is fitted to the contours of all captured images (except the base and apex) using the method described in the three-dimensional automated segmentation and the resulting values for the center of ellipsoid and its semi-axes $(x_0, y_0, z_0, a_x, a_y, a_z)$ are set as the initial parameters for the Levenberg-Marquardt algorithm. Note that in this alternative embodiment, the contours of the base and apex are not used but are found using the rest of the contours.

Non-Symmetry about the Sagittal Plane

In some cases the oncologist involved in prostate brachytherapy may make use of sagittal and para-sagittal images of the prostate. Since the prostate is assumed to have an ellipsoidal shape, it follows that para-sagittal cross-sections of the prostate will have an elliptical shape. Therefore, the steps of the two-dimensional and three-dimensional automated segmentation methods can be applied to para-sagittal captured images with minor modifications.

In an alternative embodiment, a method of automated segmentation of para-sagittal captured images is provided. In the Initialization step, the sagittal plane is used, resulting in a captured cross-section that appears as a flattened ellipse. The captured cross-section can be transformed into an ellipse by determining a warping function that deforms the captured image as a function of axial distance form the center of the ultrasound probe. Image elements in the captured image that are closer to the center of the ultrasound probe are propagated closer to the center of the ultrasound probe, and image elements that are farther from the center of the ultrasound probe are propagated to a lesser extent.

The same Gaussian warping function used could be used where the angle θ corresponds to the angle of the sagittal crystal of the dual-axis TRUS probe typically used in such procedures. Following the warping step, first the sagittal slice would be segmented using an ellipse fit to a number of initialization points, the IMMPDA algorithm to guide an edge-detector, followed by a second ellipse fit. The process would be repeated for para-sagittal slices of larger and larger angle to the sagittal plane until all planes up to an angle large enough to cover the entire prostate with the sagittal (axial) crystal (normally up to about 50 degrees) would be segmented. The points obtained by the edge detector would then be fitted by one 3D ellipsoid, again by solving a convex problem. Finally, the inverse warping function would be applied to each sagittal slice at each angle in order to show the segmented prostate contour upon each sagittal and para-sagittal image.

Other

While the embodiments described thus far have been directed towards a method and system for delineating the contour of a human prostate organ, the method and system is also applicable to other human organs and tissue, such as the kidney; blood vessels; tumors; ablated tissue for treatment (e.g. RF-abated liver tumors) and other pathological events, such as infections or wounds. In addition, the method and system is applicable to the fetus or embryo in a pregnant female, as well as, veterinary applications for large or small animals. Further, while the embodiments described thus far have been directed towards a method and system for delineating the contour of a human prostate organ in ultrasound medical images, the method and system is also applicable to X-ray images, PET images, MRI images, images captured by a camera, and combinations thereof.

What is claimed is:

1. A computer readable medium having instructions and statements stored therein for execution by a processor to perform a method for delineating the contour of a tissue region in a captured medical image, the captured image comprising a captured cross-section of the tissue region, the method comprising the steps of:
   (a) generating a transformed image of the captured image by applying a transformation to the captured image such that the captured cross-section in the captured image is transformed into a transformed cross-section in the transformed image that resembles a pre-determined two-dimensional shape which is more computationally tractable than the captured cross-section;
   (b) solving for an initial edge contour of the tissue region by fitting the pre-determined two-dimensional shape to the transformed cross-section;
   (c) detecting the edge of the transformed cross-section by applying an edge-detector method within a search area of the transformed image about the initial edge contour;
   (d) solving for a final edge contour by fitting the pre-determined two-dimensional shape to the detected edge of the transformed cross-section;
   (e) solving for the two-dimensional contour of the tissue region in the captured image by applying the inverse of the transformation to the final edge contour; and
   (f) displaying the two-dimensional contour on a display.

2. The computer readable medium in claim 1, wherein the transformation is a warping function determined based on initialization points selected in the captured image.

3. The computer readable medium in claim 2, wherein the step of solving for the initial edge contour comprises the steps of:
   (a) determining a number of warped points in the transformed image; and
   (b) fitting the pre-determined two-dimensional shape to the warped points.

4. The computer readable medium in claim 3, wherein the tissue region is a human prostate organ.

5. The computer readable medium in claim 4, wherein the captured image is an ultrasound image captured by an ultrasound probe.

6. The computer readable medium in claim 5, wherein the pre-determined two-dimensional shape is an ellipse.

7. The computer readable medium of claim 6, wherein the warping function translates image elements in the captured image towards the center of the ultrasound probe such that:
   (a) image elements that are a closer radial distance to the center of the ultrasound probe are translated a greater radial distance towards the center than image elements that are a farther radial distance from the center; and
   (b) image elements that are a closer angular distance to a selected axis originating at the center of the ultrasound probe are translated a greater radial distance towards the center than image elements that are a farther angular distance from the axis.

8. A computer readable medium having statements and instructions stored therein for execution by a processor to perform a method for delineating the contour of a tissue region in a set of captured medical images, each captured image comprising a captured cross-section of the tissue region, the method comprising the steps of:
   (a) selecting a first captured image from the set of captured images of the tissue region;
   (b) for the first captured image:
      (i) generating a transformed image of the first captured image by applying a transformation to the first captured image such that the captured cross-section in the first captured image is transformed into a transformed cross-section in the transformed image that resembles a pre-determined two-dimensional shape which is more computationally tractable than the captured cross-section;
      (ii) solving for an initial edge contour by fitting the pre-determined two-dimensional shape to the transformed cross-section;
      (iii) detecting the edge of the transformed cross-section by applying an edge-detector method within a search area of the transformed image about the initial edge contour; and
      (iv) solving for a final edge contour by fitting the pre-determined two-dimensional shape to the detected edge of the transformed cross-section;
   (c) for each captured image in the set of captured images, other than the first captured image:
      (i) generating a transformed image by applying the transformation to the captured image such that the captured cross-section in the captured image is transformed into a transformed cross-section in the transformed image that resembles the pre-determined two-dimensional shape;
  (ii) solving for an initial edge contour;
  (iii) detecting the edge of the transformed cross-section by applying an edge-detector method within a search area of the transformed image about the initial edge contour; and
  (iv) solving for the final edge contour by fitting the first pre-determined two-dimensional shape to the detected edge of the transformed cross-section;
(d) solving for a final surface contour of the tissue region by fitting a pre-determined three-dimensional shape to the final edge contours associated with each captured image in the set of captured images;
(e) solving a three-dimensional contour of the tissue region by applying the inverse of the transformation to the final surface contour; and
(f) displaying a cross-section of the three-dimensional contour on a display.

9. The computer readable medium in claim 8, wherein the step of solving an initial contour in step (c)(ii) comprises selecting the initial contour as a final edge contour associated with a different captured image.

10. The computer readable medium in claim 9, wherein the step of solving the three-dimensional contour of the tissue region comprises the steps of:
  (a) segmenting the final surface contour into a set of refined edge contours, each refined edge contour comprising a cross-section of the final surface contour; and
  (b) solving for the three-dimensional contour of the tissue region by applying the inverse of the transformation to each refined edge contour.

11. The computer readable medium in claim 10, wherein solving for the final surface contour comprises the steps of:
  (a) solving for an initial surface contour by fitting the pre-determined three-dimensional shape to the final edge contours of the transformed images associated with the set of captured images; and
  (b) solving for the final surface contour by fitting the pre-determined three-dimensional shape to the refined edge contours, an apex contour and a base contour.

12. The computer readable medium in claim 11, wherein the transformation is a warping function determined based on initialization points selected in the first captured image.

13. The computer readable medium in claim 12, wherein the step of solving for the initial edge contour comprises the steps of:
  (a) solving for warped points in the transformed image; and
  (b) fitting the pre-determined two-dimensional shape to the warped points.

14. The computer readable medium in claim 13, wherein the pre-determined two-dimensional shape is an ellipse and the pre-determined three-dimensional shape is an ellipsoid.

15. The computer readable medium in claim 11 wherein:
  (a) the transformation comprises the application of the following functions to the captured image:
    (i) a warping function determined based on initialization points selected in the first captured image; and
    (ii) an un-tapering function determined based on an apex plane and a base plane selected from the set of captured images, and the location of the initialization points in the captured image after application of the warping function;
  (b) the step of solving an initial contour in step (c)(ii) comprises selecting a cross-section of a three-dimensional contour formed by:
    fitting a first semi-ellipsoid to the apex plane and the final edge contour associated with the first captured image; and
    (ii) fitting a second semi-ellipsoid to the base plane and the final edge contour associated with the first captured image.

16. The computer readable medium in claim 15, wherein the pre-determined two-dimensional shape is an ellipse and the pre-determined three-dimensional shape is a tapered ellipsoid.

17. The computer readable medium in claim 14, wherein the tissue region is a human prostate organ.

18. The computer readable medium in claim 17, wherein the set of captured images are ultrasound images captured by an ultrasound probe.

19. The computer readable medium in claim 18, wherein the first captured image is a cross-section of the mid-gland of the prostate.

20. The computer readable medium of claim 19, wherein the warping function translates image elements in the captured image towards the center of the ultrasound probe such that:
  (a) image elements that are a closer radial distance to the center of the ultrasound probe are translated a greater radial distance towards the center than image elements that are a farther radial distance from the center, and
  (b) image elements that are a closer angular distance to a selected axis originating at the center of the ultrasound probe are translated a greater radial distance towards the center than image elements that are a farther angular distance from the axis.

\* \* \* \* \*